United States Patent [19]

Malik

[11] Patent Number: 5,488,551
[45] Date of Patent: Jan. 30, 1996

[54] PULSE WIDTH MODULATED POWER SUPPLY WHICH AVOIDS EXCESSIVE ON-TIME OF SWITCH DURING START-UP

[75] Inventor: Randhir S. Malik, So. Burlington, Vt.

[73] Assignee: International Business Machines Corporation, Armonk, N.Y.

[21] Appl. No.: 143,818

[22] Filed: Oct. 27, 1993

[51] Int. Cl.⁶ .................................................. H02M 3/335
[52] U.S. Cl. .................. 363/20; 363/49; 363/97; 363/131
[58] Field of Search .................. 363/200, 21, 49 X, 363/97 X, 131 X

[56] References Cited

U.S. PATENT DOCUMENTS

| | | | |
|---|---|---|---|
| 3,852,623 | 12/1974 | Nelson et al. | 307/293 |
| 4,405,975 | 9/1983 | Overstreet et al. | 363/49 |
| 4,504,898 | 3/1985 | Pilukaitis et al. | 363/49 |
| 4,625,271 | 11/1986 | Chetty et al. | 363/49 |
| 4,695,936 | 9/1987 | Whittle | 363/21 |
| 4,806,842 | 2/1989 | Bittner | 323/222 |
| 4,816,982 | 3/1989 | Severinsky | 363/44 |
| 4,887,199 | 12/1989 | Whittle | 363/49 |
| 4,928,218 | 5/1990 | Kluttz | 363/37 |
| 4,941,076 | 7/1990 | Diaz | 363/49 |
| 5,063,303 | 11/1991 | Sackman et al. | 307/296.1 |

FOREIGN PATENT DOCUMENTS 3131272  2/1983  Germany ......................... H02P 13/22

*Primary Examiner*—Jeffrey L. Sterrett
*Attorney, Agent, or Firm*—Arthur J. Samodovitz

[57] ABSTRACT

A pulse width modulated power supply comprises a power transformer having a primary winding, a secondary winding and means for coupling one end of the primary winding to a DC power supply. A semiconductor switch is coupled to the other end of the primary winding to control power through the primary winding. A rectifier is connected across the secondary winding to rectify current induced in the secondary winding, and supplies the rectified current to an output capacitor to develop a DC output voltage. A control circuit controls the duty cycle of the switch based on charging time of a first, relatively small capacitor during start up. The resultant voltage is compared to a reference voltage and when the voltage across the first capacitor just exceeds the reference voltage, the switch is turned off. Because the first capacitor is relatively small, the charging time is short and widths of pulses through the primary winding are relatively short during start up. This reduces heating of the switch during start up. The control circuit controls the duty cycle of the switch based on charging time of the first capacitor and a second, relatively large capacitor in parallel afterwards such that widths of pulses through the primary winding are relatively long and the power supply can supply operating current to the load.

15 Claims, 2 Drawing Sheets

PULSE WIDTH MODULATED POWER SUPPLY WHICH AVOIDS EXCESSIVE ON-TIME OF SWITCH DURING START-UP

BACKGROUND OF THE INVENTION

The invention relates generally to pulse width modulated power supplies, and deals more particularly with a pulse width modulated power supply having circuitry to protect a switch which pulse width modulates input voltage to a power train transformer.

A standard pulse width modulated power supply comprises a power train transformer having primary and secondary windings. One end of the primary winding is connected to a DC voltage source and the other end is connected to a semiconductor switch. The switch is repeatedly turned on and off to develop an AC voltage across the primary winding. A half or full wave rectifier bridge is connected across the secondary winding and charges an output capacitor to supply the output DC voltage. The following prior art technique is used to regulate the output voltage during start up and during normal operating conditions. A clock periodically sets an RS flip flop to turn on the switch to deliver power through the transformer. The output voltage is compared to a reference voltage and when the output voltage rises just above the reference voltage, a comparator resets the flip flop to turn off the switch. The switch stays off until the next clock cycle. The longer the switch stays on during each cycle, the higher the output voltage and vice verse. Thus, the feedback from the output voltage regulates the output voltage to the desired level. The reference voltage can be designed to increase gradually during start up so the output current is limited during start up to prevent large current surges. Afterwards, the reference voltage reaches a constant level so the power supply can deliver operating current. One problem with such a pulse width modulated power supply is that at initial start up, substantial current will still flow to the output capacitor of the power supply and a capacitive load and the switch will stay turned on for a long time. This may burn-out the switch.

Another prior art technique to control the switch uses a differential amplifier that receives at one input a fixed reference voltage and at the other input the output voltage. The output of the differential amplifier is called an "error voltage" and is proportional to the difference between the output voltage and the reference voltage. The output of the differential amplifier charges a reference capacitor through a current limiting resistor and diode. The voltage across the reference capacitor and diode forms a second reference voltage and is supplied to one input of a comparator. The other input is supplied by the voltage across a timing capacitor which is charged by rectified current from a secondary of another, sense transformer. When the voltage across the timing capacitor just exceeds the second reference the switch, the comparator resets the flip flop which shuts off the switch (until the next cycle of the clock). Also, the flip flop activates a transistor to discharge the timing capacitor. Because the second reference voltage rises gradually as the reference capacitor charges, the output current is limited during start up. Eventually, the reference capacitor charges to a fixed level and the timing capacitor requires sufficient time to rise to the fixed reference voltage so that the power supply can deliver operating current. The switch in this prior art power supply is also turned on for an extended time during start up because of the capacitive load and may burn-out.

Accordingly, a general object of the present invention is to provide a pulse width modulated power supply which avoids prolonged turn on of the primary winding semiconductor switch during start up and overload conditions.

SUMMARY OF THE INVENTION

The invention resides in a pulse width modulated power supply which reduces the time that the transformer switch is turned on during start up. The power supply comprises a power transformer having a primary winding, a secondary winding and means for coupling one end of the primary winding to a DC power supply. The switch is coupled to the other end of the primary winding to control power through the primary winding. A rectifier is connected across the secondary winding to rectify current induced in the secondary winding, and supplies the rectified current to an output capacitor to develop a DC output voltage. A novel control circuit controls the duty cycle of the switch based on charging time of a first, relatively small timing capacitance during start up such that widths of pulses through the primary winding are relatively short. This reduces the heating of the switch during start up and chance of failure of the switch. The control circuit controls the duty cycle of the switch based on charging time of a second, relatively large timing capacitance afterwards such that widths of pulses through the primary winding are relatively long and the power supply can supply operating current to the load. During overload conditions, the control circuit again controls the duty cycle of the switch based on the charging time of the first, relatively small timing capacitance to reduce output power and thereby prevent damage to the power supply and load.

DETAILED DESCRIPTION OF THE PREFERRED EMBODIMENT

Figure 1:
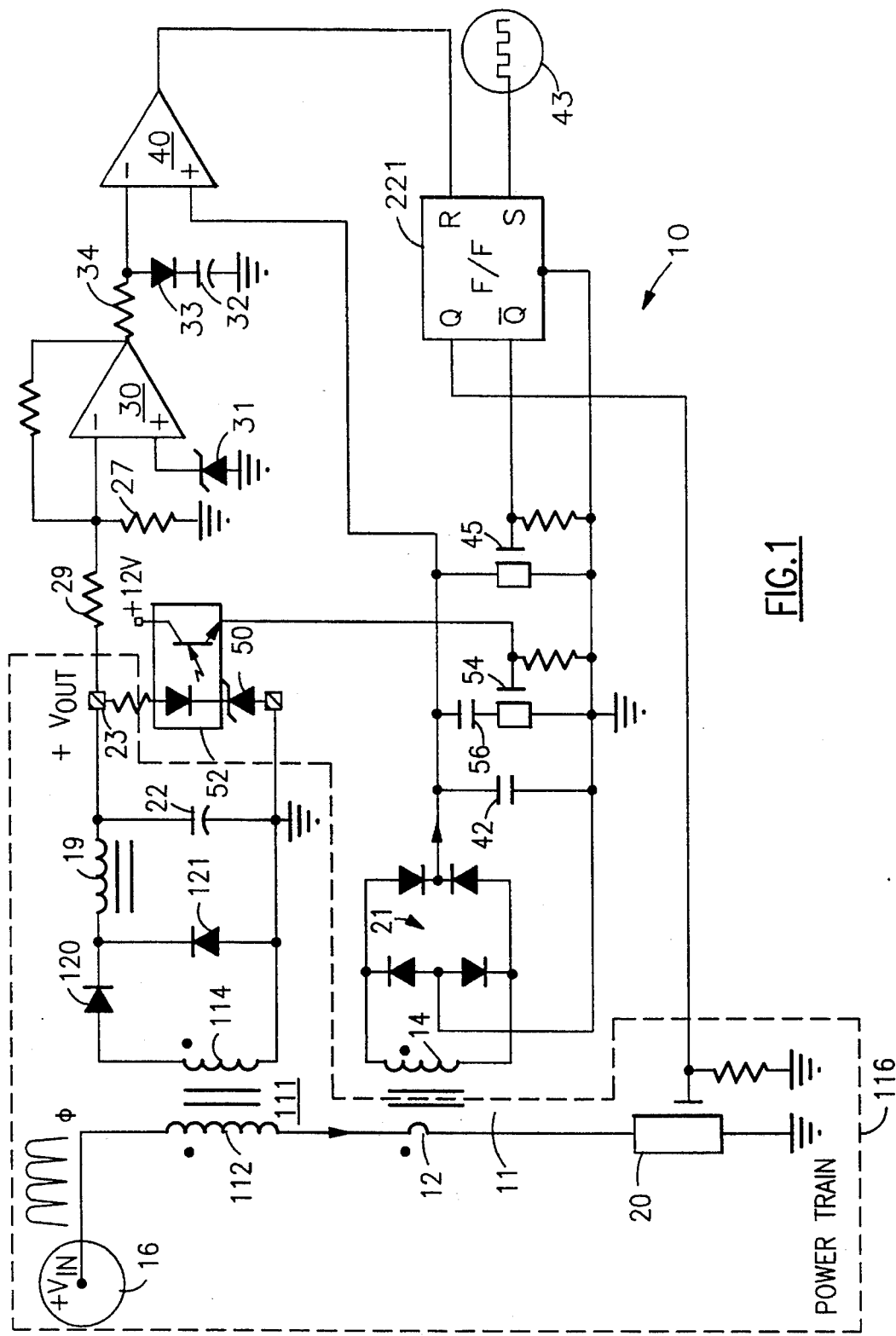
FIG. 1 is a circuit diagram of a pulse width modulated power supply according to the present invention.

FIG. 1 illustrates a pulse width modulated power supply generally designated 10 according to the present invention. Power supply 10 comprises a power transformer 111 and a series, current sense transformer 11. Transformer 11 has a primary winding 12 and a secondary winding 14 and transformer 111 has a primary winding 112 and a secondary winding 114. Transformer 111 is part of a power train 116 and transformer 11 is part of pulse width modulating control circuitry for the power train. A DC source 16 is connected to one end of the series primary windings 112 and 12 and a transistor switch 20 is connected to the other end. An RS flip flop 221 controls switch 20 as described in more detail below to regulate the amount of power delivered to transformers 111 and 11.

Within the power train, rectifiers 120 and 121 and a low pass filter comprising a series inductor 19 and a parallel, output capacitor 22 are connected across the secondary winding 114. A DC output voltage 23 is developed across the output capacitor 22 based on the duty cycle of switch 20 as described below.

Within the control circuitry, a full wave rectifier bridge 21 and a parallel, timing capacitor 42 are connected across the secondary winding 14. Flip flop 221 has a set input which is supplied by a clock 43. When clock 43 outputs a positive pulse, the flip flop turns on switch 20. This causes voltage to be applied across transformers 111 and 11, and charging current to be delivered to output capacitor 22 and timing capacitor 42.

Figure 2:
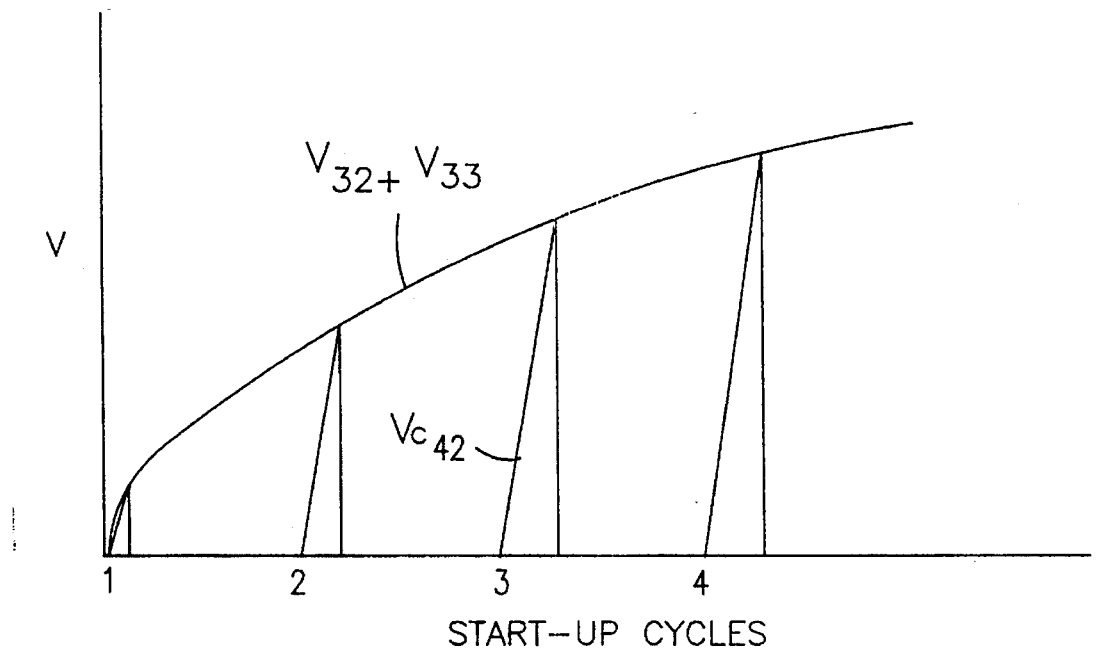
FIG. 2 is a graph of voltages developed across a timing capacitor within the circuit of FIG. 1 during start up.

The control circuitry uses the DC output voltage 23 for regulation as follows. The DC output voltage is divided by resistors 27 and 29 and supplied to one input of a differential amplifier 30. The other input is supplied by a reference voltage developed by a zener diode 31. Initially, the reference voltage is greater than the DC output voltage because the output capacitor 22 cannot charge instantaneously. Consequently, the differential amplifier 30 outputs a positive voltage which charges a capacitor 32 through a resistor 34 and a diode 33. The resultant voltage across capacitor 32 (and diode 33) rises exponentially as illustrated in FIG. 2. (The voltage rise is exponential because as the output voltage rises, the divided voltage across resistor 27 approaches the voltage across zener diode 31, and the charging current output from the differential amplifier 30 is reduced.)

The exponential voltage across capacitor 32 (and diode 33) is supplied to the inverting input of comparator 40. The positive input of comparator 40 is supplied by the voltage across timing capacitor 42. The output of comparator 40 is connected to the reset input of flip flop 21. Timing capacitor 42 is much smaller than capacitor 32, has a smaller time constant than capacitor 32 and receives charging current from the bridge 21. The voltage across timing capacitor 42 is illustrated in FIG. 2. Capacitor 42 charges much faster than capacitor 32, and the voltage across capacitor 42 quickly exceeds the voltage across capacitor 32. When the voltage across capacitor 42 exceeds the reference voltage across diode 33 and capacitor 32, the output of comparator 40 goes high and resets flip flop 221 which turns off switch 20. This prevents excessive current flow in and heating of switch 20 in accordance with the object of the present invention. Nevertheless, output capacitor 22 obtained some charge during this time. An npn transistor 45 is activated by the Q not output of flip flop 221 when switch 20 is turned off to discharge timing capacitor 42. Because of the large size of output capacitor 22 and the large time constant, capacitor 22 retains substantially all of its charge when switch 20 is turned off for a short time. Switch 20 remains turned off until the next, second cycle of clock 43. At that time, flip flop 221 is set again and turns on switch 20. This causes additional power to be delivered to transformers 111 and 11, and current to be delivered to the output capacitor 22 and timing capacitor 42. Because the DC output voltage, divided by resistors 27 and 29, is still less than the reference voltage, amplifier 30 outputs a positive DC voltage and delivers additional current to capacitor 32. The new current from amplifier 30 increases the voltage of capacitor 32 (which was prevented by diode 33 from discharging when switch 20 was turned off). Capacitor 42 still charges much faster than capacitor 32 and eventually overtakes capacitor 32 in voltage; however the time required is greater (but still safe for switch 20) during this cycle than during the first cycle because the voltage of capacitor 32 is now higher. Thus, a greater amount of current is delivered to the output capacitor 22 during the second cycle than during the first. When the voltage across timing capacitor 42 exceeds the voltage of diode 33 and capacitor 32, the output of comparator 40 goes high and resets flip flop 21 which turns off switch 20. The foregoing process is repeated many times, with the amount of power delivered to the output capacitor 22 increasing each cycle. However, it should be noted that because of the short time constant of capacitor 42, the duty cycle of switch 20 is still short enough to prevent excess current flow in and heating of switch 20 in accordance with the object of the present invention.

Figure 3:
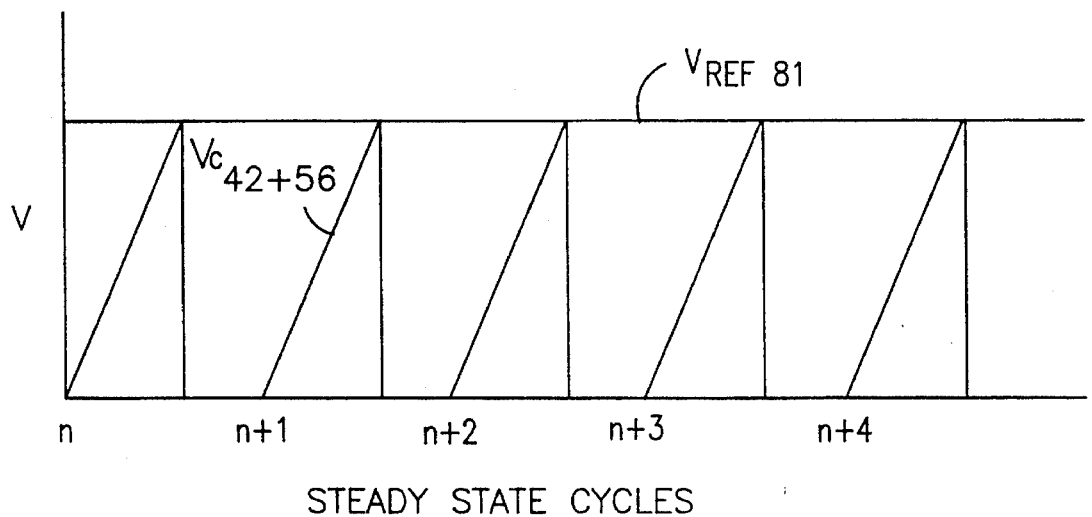
FIG. 3 is a graph of voltages developed across two parallel timing capacitors within the circuit of FIG. 1 during steady state.

Subsequently, the DC output voltage 43 exceeds the voltage of a zener diode 50 and activates an optical coupler 52. At this time, the power supply is expected to supply full operating current to the load. Accordingly, optical coupler 52 turns on an npn transistor 54 which causes another timing capacitor 56 to act in parallel with timing capacitor 42. Timing capacitor 56 is much larger than timing capacitor 42 so the combined time constant is much larger than the time constant of capacitor 42 alone during start up as illustrated by the broader sawtooth curve of FIG. 3 compared to the narrower sawtooth curve of FIG. 2. Consequently, during each steady state cycle, the switch 20 will stay on for a much longer time than previously, while capacitors 42 and 56 charge to the voltage across capacitor 32 and diode 33. This additional duty of switch will provide the additional power to transformer 111 needed to supply the required operating current to the load. However, because there are no longer the surge conditions present at start up, the duty cycle of switch 20 is still within the limits of safe operation. The magnitude of the combined capacitance of capacitors 42 and 56 (and limit on charging current from sense transformer 11) determine the maximum duty cycle of power transformer 111 and therefore, the maximum amount of power that can be delivered to the load.

The foregoing control circuitry within power supply 10 also provides short circuit and overload protection circuitry. When the load is short circuited or overloaded, the output voltage drops below the reference voltage established by zener diode 50. As a result, opto-coupler 52 shuts off and turns off transistor 54. This prevents capacitor 56 from acting in parallel with capacitor 42, and the duty cycle of switch 20 is again very small. The result is that little power is now available for the load, and this prevents damage due to the short circuit or overload.

Based on the foregoing, a pulse width modulated power supply according to the present invention has been disclosed. However, numerous modifications and substitutions can be made without deviating from the scope of the present invention. For example, if desired, instead of using switch 54 to connect parallel capacitor 56 during steady state, other switches could be used instead to connect a resistor in series with capacitor 42 during steady state to increase the RC time constant. Therefore, the invention has been disclosed by way of illustration and not limitation and reference should be made to the following claims to determine the scope of the present invention.

I claim:

1. A pulse width modulated power supply comprising:

an input transformer having a primary winding, a secondary winding and means for coupling the primary winding to a DC power supply;

a switch coupled to the primary winding to control power through the primary winding;

a rectifier connected across the secondary winding to rectify current induced in the secondary winding;

an output capacitor coupled to the rectifier to develop a DC output voltage; and means for controlling said switch based on a first, relatively short RC time constant during start up such that widths of pulses through said primary winding are relatively short and controlling said switch based on a second, relatively long RC time constant afterwards such that widths of pulses through said primary winding are relatively long.

2. A power supply as set forth in claim 1 wherein the controlling means comprises first and second timing capacitors and means for selecting the first timing capacitor during start up to cause in part the relatively short RC time constant and relatively short pulse widths and selecting a parallel combination of said first and second timing capacitors afterwards to cause in part the relatively long RC time constant and relatively long pulse widths.

3. A power supply as set forth in claim 2 further comprising a sense transformer in series with said input transformer, and a rectifier connected to a secondary winding of said sense transformer and wherein said first and second timing capacitors are charged by current from said rectifier connected to the secondary winding of said sense transformer.

4. A power supply as set forth in claim 1 wherein the controlling means comprises a timing capacitor, means for charging said timing capacitor and means for generating a gradually rising reference voltage during start up and comparing a voltage developed across said timing capacitor during the charging to said reference voltage to control operation of said switch, said relatively short RC time constant being based in part on said timing capacitor.

5. A power supply as set forth in claim 4 wherein said controlling means comprises means for discharging said timing capacitor after said switch is turned off.

6. A power supply as set forth in claim 4 wherein said controlling means includes means for causing a second timing capacitor to act in parallel with the first said timing capacitor after start up, said reference voltage is substantially constant after start up, and the comparing means compares the voltage across both of said timing capacitors to said substantially constant reference voltage to determine when to turn off said switch.

7. A power supply as set forth in claim 1 further comprising:
another transformer having another primary winding, another secondary winding and means for coupling said other primary winding to receive current from said DC power supply; and
a full wave rectifying bridge connected across said other secondary winding.

8. A power supply as set forth in claim 7 wherein the controlling means comprises a timing capacitor which is charged by current from said full wave rectifying bridge, and means for comparing a voltage across said timing capacitor to a reference voltage to determine when to turn off said switch.

9. A power supply as set forth in claim 1 wherein said switch comprises a transistor.

10. A power supply as set forth in claim 1 wherein the controlling means also controls said switch based on the first RC time constant during overload or short circuit conditions.

11. A pulse width modulated power supply comprising:
an input transformer having a primary winding, a secondary winding and means for coupling one end of the primary winding to a DC power supply;
a switch coupled to the other end of the primary winding to control power through the primary winding;
a rectifier connected across the secondary winding to rectify current induced in the secondary winding;
an output capacitor coupled to the rectifier to develop a DC output voltage; and
means for controlling said switch based on charging time of a first, relatively small timing capacitance during start up such that widths of pulses through said primary winding are relatively short and controlling said switch based on charging time of a second, relatively large timing capacitance afterwards such that widths of pulses through said primary winding are relatively long.

12. A power supply as set forth in claim 11 wherein the controlling means comprises first and second timing capacitors and means for selecting the first timing capacitor during start up to form said first capacitance and selecting the first and second capacitors in parallel afterwards to form said second capacitance.

13. A power supply as set forth in claim 11 wherein the controlling means comprises means for charging said first timing capacitor during start up and means for generating a gradually rising reference voltage during start up and comparing a voltage developed across said first timing capacitor during start up to said reference voltage to control operation of said switch.

14. A power supply as set forth in claim 13 wherein said controlling means comprises means for discharging said first timing capacitor after said switch is turned off.

15. A power supply as set forth in claim 11 wherein the controlling means also controls said switch based on charging time of the first timing capacitance during overload or short circuit conditions.

* * * * *